April 11, 1933.  H. H. LINN  1,903,629
VEHICLE BRAKE
Filed April 2, 1928    2 Sheets-Sheet 1
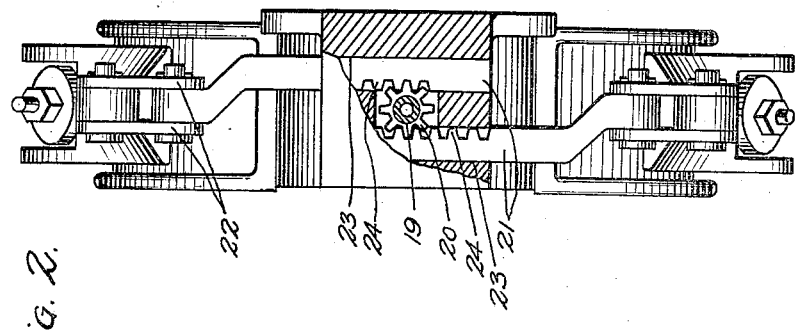
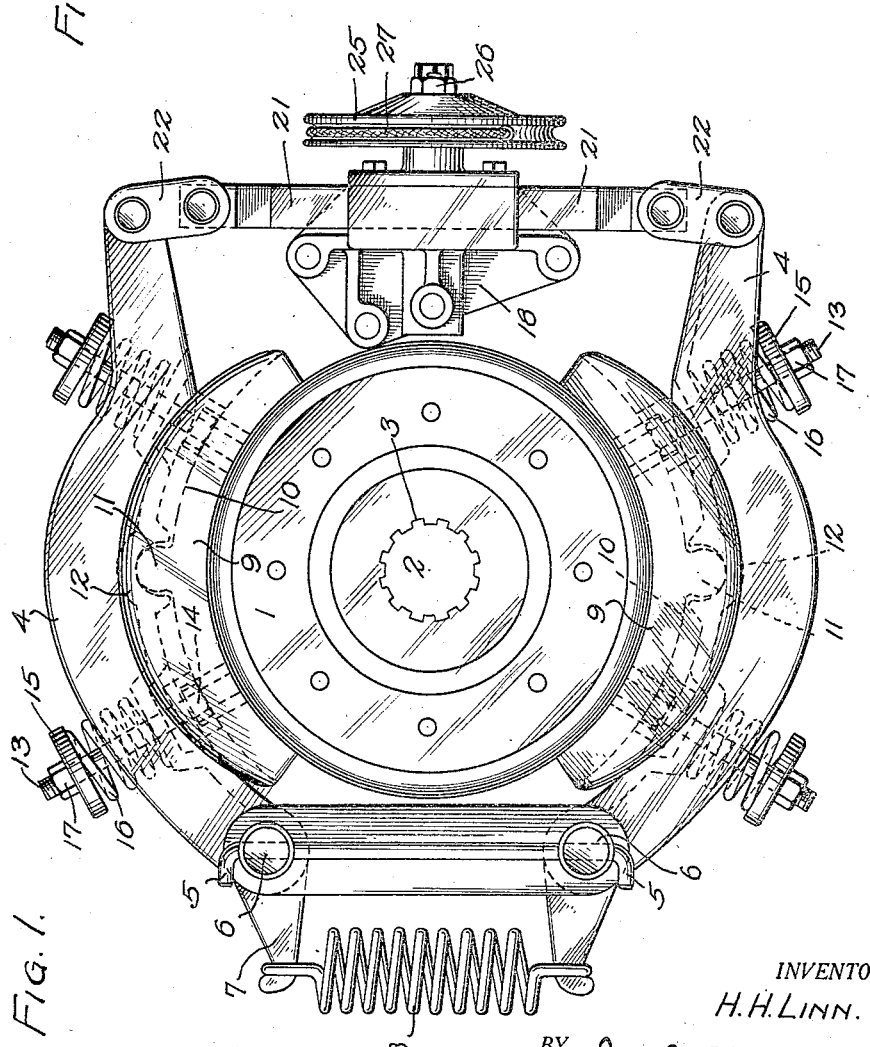
INVENTOR.
H. H. LINN.
BY
ATTORNEY.

April 11, 1933.      H. H. LINN      1,903,629
VEHICLE BRAKE
Filed April 2, 1928      2 Sheets-Sheet 2

INVENTOR.
H. H. LINN.
BY
ATTORNEY.

Patented Apr. 11, 1933

1,903,629

UNITED STATES PATENT OFFICE

HOLMAN HARRY LINN, OF MORRIS, NEW YORK, ASSIGNOR TO THE LINN MANUFACTUR-
ING CORPORATION, OF MORRIS, NEW YORK, A CORPORATION OF NEW YORK

VEHICLE BRAKE

Application filed April 2, 1928. Serial No. 266,823.

The invention relates to brake assemblies mainly intended for vehicles and tractors.

One object is to provide for so mounting the brake drum with relation to the universal that failure of the latter will not render the brake drum useless; in short, to provide for rotative effort of the brake drum at all times while the vehicle is in motion and whether or not it is propelled by the engine.

Another object is the provision of a braking system in which the drum and brake shoes are adapted and arranged for metal to metal contact, and in which the elements are readily adjustable to compensate for wear.

Other objects, as well as the nature, characteristic features and scope of the invention, will be more readily understood from the following description taken in connection with the annexed drawings, wherein Figure 1 is an elevational view of the brake assembly.

Fig. 2 is an end view, partly broken away, of the same.

Figure 5:
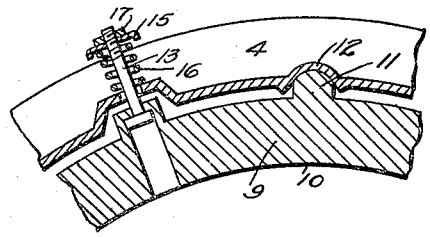
Fig. 5 is a sectional detail showing the manner in which the bolts restrain the shoes.
Figure 3:
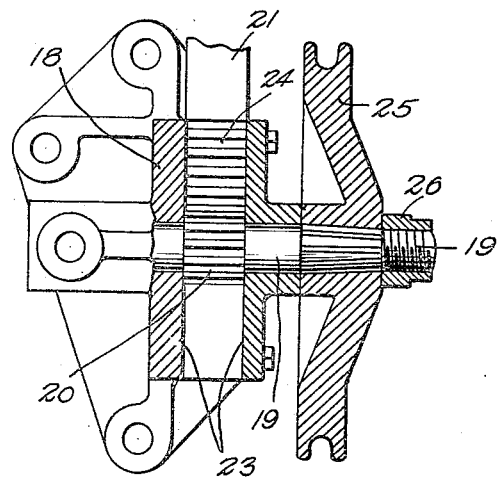
Fig. 3 is a section on line 3—3 of Fig. 1.
Figure 4:
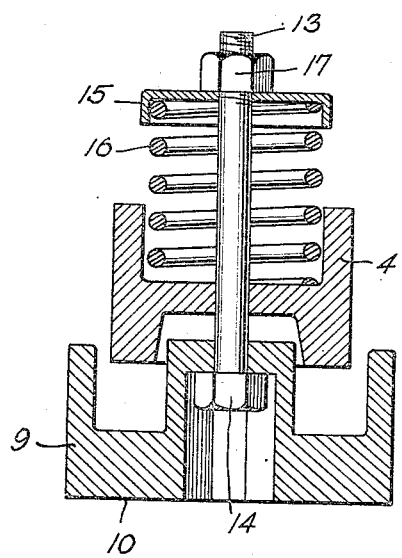
Fig. 4 is a section on line 4—4 of Fig. 1.

The brake assembly includes a brake drum 1, preferably a heat-treated alloy steel casting, which is secured on the tail shaft 2 of the differential through the medium of a spline and broach connection, as illustrated at 3 in Figure 1. Thus there is insured in a simple way a positive connection of the drum and tail shaft, which makes the drum rotative with the rear universal, to which the drum is connected.

Arms 4 are pivotally secured at 5 on studs 6 which project from a suitable cross member carried by the frame of the vehicle. The arms are extended, as at 7, and connected by springs 8 tending to hold them in idling or non-braking position.

Brake shoes 9, preferably of gray iron, have curved inner faces 10 which conform to the circumference of the brake drum; and said shoes are equipped with projections 11 adapted loosely to seat in recesses or bearings 12 formed in the arms 4 and thereby operate as fulcrums. Bolts 13 extended radially of the brake drum pass through the brake shoes adjacent each end thereof and through the adjacent arm 4, the heads 14 of the bolts seating in recesses in the brake shoes to limit movement of the bolts in one direction. The bolts 13 are provided, beyond the arms 4, with spring caps 15 between which and the arms are arranged springs 16, nuts 17 on the ends of the bolts serving, obviously, to adjust the tension of the springs.

Operatively mounted with relation to the arms 4, is a housing 18 secured to a relatively fixed part of the vehicle frame. A shaft 19 is afforded bearings in the housing and projects in one direction beyond the same at right angles to the axis of the brake drum, its housed portion being provided with a pinion 20, designed to operate bars 21 which are connected by links 22 to the respective arms 4. The bars 21 are accommodated in ways or guide slots 23 and are formed with offset racks 24 designed to mesh with the pinion. Evidently, operation of the pinion will cause the bars and the arms to be moved in relatively opposite directions.

A sheave 25 is secured upon the projecting end of shaft 19, the connection between the sheave and shaft being preferably a taper serrated connection fixed by a nut 26. An operating steel cable 27, or its equivalent, is terminally secured to the sheave and is thence extended to the usual service means, such as the conventional pedal or lever.

In operation, pull on the cable actuates the pinion through the sheave connection, drawing the arms 4 towards each other and causing braking cooperation between the brake shoes 9 and the surface of the brake drum 1. The brake shoes are prevented from turning by reason of their fulcrum supports, while the spring connection between the shoes and arms enables the shoes to conform to the circumference of the brake drum and thus compensate for wear of the parts. The springs 16 also serve to prevent rattling of the shoes due to vibration of the vehicle. Manifestly, upon release of tension on the cable 27, the arms 4 will be shifted under the influence of the springs 8, thus relieving the brake drum of the pressure of the brake shoes.

Evidently wear of brake shoes tends to reduce the effective length of the cable and this condition readily is compensated for by simply removing the nut 26, and adjusting the sheave 25. Thus, stretching of the cable in use or wear on the brake shoes may readily be compensated for through an extremely simple adjustment.

The parts are fitted with accessories indicated at 28 for convenient lubrication of the parts.

The provision of the brake drum on the tail shaft of the vehicle differential renders the brake serviceable at all times when the vehicle is in motion, whether under power or not. Hence, if, for any reason, the universal should fail, the brake of this invention will be effective to check movement of the vehicle because the construction and assembly are such that rotation of the brake drum is not dependent upon the universal.

Having described my invention, I claim

1. A braking system including a brake drum, arms, brake shoes having a self centering connection with said arms, and means for operating said arms including a cable-operated sheave rotatively adjustable to compensate for ineffectiveness of the cable due to wear of the braking parts.

2. A braking system including a brake drum, arms pivotally supported at opposite sides of the drum, brake shoes having a self centering mounting in said arms, spring means between the arms and shoes, and cable-operated means including a sheave rotatably adjustable to compensate for wear for actuating the arms in service application of the shoes.

3. A braking system including a brake drum, arms pivotally supported at opposite sides of the drum, shoes having projections to loosely seat in recesses in the arms, springs intermediate the shoes and arms, racks bars connected to the respective arms and extended in parallel relation, a pinion cooperating with said rack bars and acting to move said bars in opposite directions, a sheave having rotative-adjustment connection with said pinion, and a cable for operating said sheave.

4. In combination with the tail shaft of a vehicle differential, a brake drum secured concentrically thereon, arms pivotally supported in substantially tangential relation to the drum, said arms being extended beyond the pivots, a spring connecting said extensions, brake-shoes carried by said arms for cooperation with said drum, a bar connected to said arm, and means for simultaneously and oppositely moving said bars to move the arms to cause the brake shoes to engage said drum, said means including a member rotatively adjustable to compensate for wear in the brake shoes.

In testimony whereof I affix my signature.

HOLMAN HARRY LINN.